United States Patent [19]

Ardon

[11] Patent Number: 5,751,800
[45] Date of Patent: May 12, 1998

[54] SCREENING OF INCOMING TELEPHONE CALLS PRIOR TO CALL COMPLETION TO THE DESTINATION PARTY

[75] Inventor: Menachem Tsur Ardon, Naperville, Ill.

[73] Assignee: Lucent Technologies Inc., Murray Hill, N.J.

[21] Appl. No.: 572,956

[22] Filed: Dec. 15, 1995

[51] Int. Cl.⁶ ............................ H04M 15/00; H04M 3/00
[52] U.S. Cl. .......................... 379/134; 379/197; 379/210
[58] Field of Search .................................. 379/127, 142, 379/133, 134, 188, 189, 196, 197, 198, 199, 201, 207, 210, 211, 212, 213, 214

[56] References Cited

U.S. PATENT DOCUMENTS

| | | | |
|---|---|---|---|
| 4,277,649 | 7/1981 | Sheinbein | 379/211 |
| 4,782,508 | 11/1988 | Borchering et al. | 379/67 |
| 4,827,501 | 5/1989 | Hansen | 379/199 |
| 5,329,578 | 7/1994 | Brennan et al. | 379/196 |
| 5,467,388 | 11/1995 | Redd et al. | 379/196 |
| 5,524,145 | 6/1996 | Parker | 379/197 |
| 5,550,904 | 8/1996 | Andruska et al. | 379/196 |

FOREIGN PATENT DOCUMENTS

0439927A2  12/1990  European Pat. Off. ......... H04M 3/42

Primary Examiner—Curtis Kuntz
Assistant Examiner—Paul Loomis
Attorney, Agent, or Firm—Charles L. Warren

[57] ABSTRACT

A destination telecommunication switch receives a request to establish a call to a first party served by the switch. The request includes call type data that identifies the party originating the call request as one of a plurality of call categories. A first record associated with the first party is read from a database. The first record includes at least one set of data which defines a call category and a corresponding call processing technique to be utilized for the call category. The switch processes the incoming call in accordance with the predetermined call category handling if the incoming call is identified by call category data in the database.

18 Claims, 2 Drawing Sheets

FIG. 3

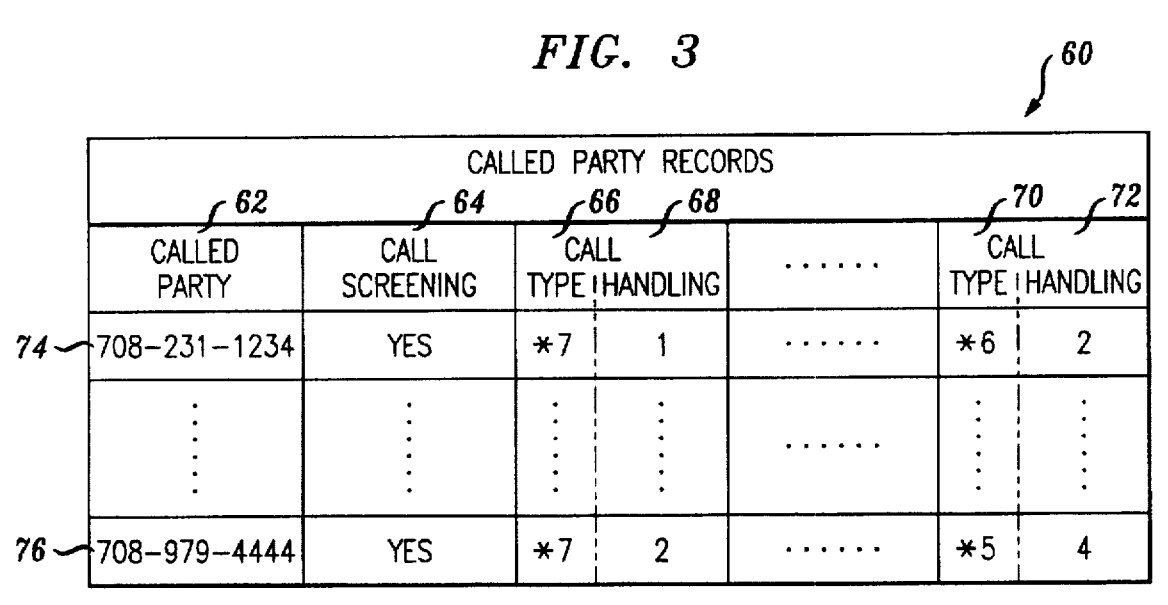

| CALLED PARTY RECORDS | | | | | | |
|---|---|---|---|---|---|---|
| CALLED PARTY | CALL SCREENING | CALL TYPE | HANDLING | ...... | CALL TYPE | HANDLING |
| 708-231-1234 | YES | *7 | 1 | ...... | *6 | 2 |
| ⋮ | ⋮ | ⋮ | ⋮ | ...... | ⋮ | ⋮ |
| 708-979-4444 | YES | *7 | 2 | ...... | *5 | 4 |

SCREENING OF INCOMING TELEPHONE CALLS PRIOR TO CALL COMPLETION TO THE DESTINATION PARTY

BACKGROUND OF THE INVENTION

This invention addresses the screening of incoming calls to a subscriber prior to call completion to the subscriber's line, e.g. prior to ringing the subscriber's telephone. More specifically, the invention addresses call screening based on the type of incoming call as determined by call type data associated with the incoming calls.

The screening of incoming calls at the subscriber's customer premises equipment (CPE), i.e. telephone set, is known. For example, calling party identification is commercially available based on the incoming call line identification (ICLID) message transmitted to the subscriber's CPE. Typically, the subscriber's CPE includes a display screen or utilizes an auxiliary device to display the ICLID message, consisting of the telephone number (or name) of the calling party. This enables the subscriber to make a decision as to whether to accept the call based on such information. However, the subscriber or automated equipment at the subscriber's location is required. Thus, it is the subscriber or the subscriber's CPE which bears the burden of handling such incoming call screening.

Call screening based on a received ICLID message may provide sufficient screening capabilities for some applications, but clearly does not provide a solution for other applications. For example, this screen technique requires that the called party have available information relating to directory numbers. Such information may not be known to the called subscriber and hence, call screening based on the calling party's directory number may provide the subscriber with little useful information. Thus, there exists a need for an improved call screening technique which does not require call screening intelligence at the called party's CPE and does not rely upon the calling party's directory number.

SUMMARY OF THE INVENTION

It is an object of the present invention to provide a call screening technique which solves this need.

In accordance with an embodiment of the present invention, a method is provided for processing incoming telephone calls in which a destination telecommunication switch receives a request to establish a call to a terminating line (first subscriber CPE). The request includes call type data identifying the party originating the request as one of a plurality of predetermined call categories. A record associated with the terminating line is located in a database and read. The record includes sets of data wherein each set includes first data defining a first call category and second data determinative of processing of the incoming call. The switch processes the incoming call as determined by the second data associated with the first call category that matches the call category of the incoming call. This processing by the switch is accomplished without completion of the call to the terminating line (first CPE).

BRIEF DESCRIPTION OF THE DRAWINGS

FIG. 3 is a table illustrating called party records which are utilized in accordance with an embodiment of the present invention.

DETAILED DESCRIPTION

Figure 1:
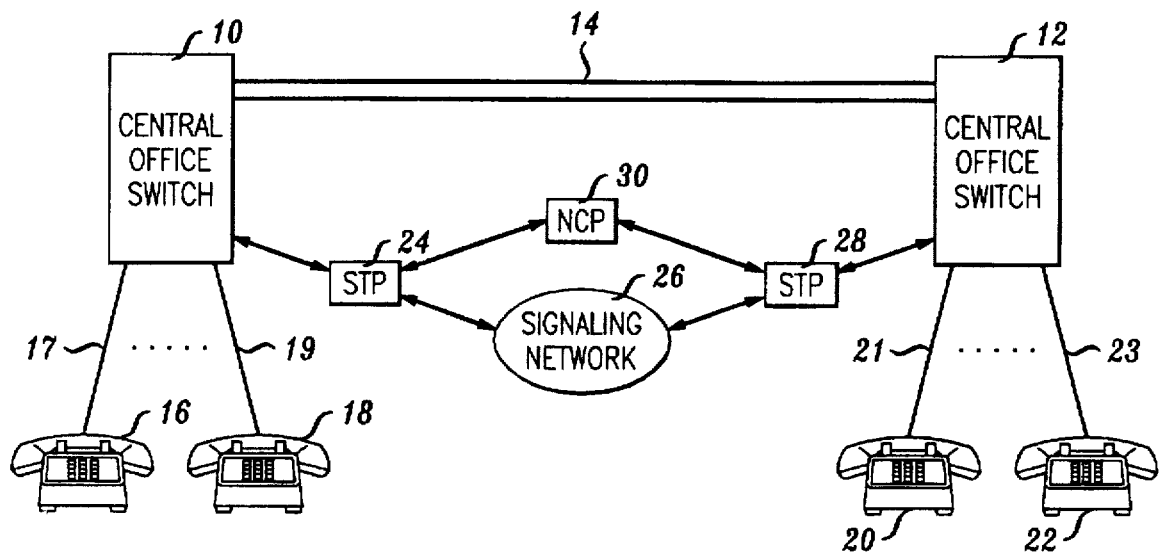
FIG. 1 is a block diagram of a telecommunication network which employs an embodiment of the present invention.

Central office switch 10 is coupled to central office switch 12 by trunk group 14 which carry subscriber communications. Subscribers associated with CPE 16 and 18 are coupled by lines 17 and 19 to central office switch 10; subscribers associated with CPE 20 and 22 are coupled by lines 21 and 23 to central office switch 12. Signaling relating to the setup, routing and maintenance of traffic on trunk group 14 is communicated, such as by using signaling system (SS) 7, between central office switches 10 and 12 by signaling transfer points (STPs 24 and 28) and signaling network 26 which may comprise a data transmission facility or a network of STPs. A network control point (NCP) 30 is coupled to the STPs and provides a known database capability which may be accessed by messages communicated through the STP network. In the illustrative example, the elements shown in FIG. 1 may comprise equipment available through AT&T Corp. such as 5ESS® switches, STP and NCP equipment.

Figure 2:
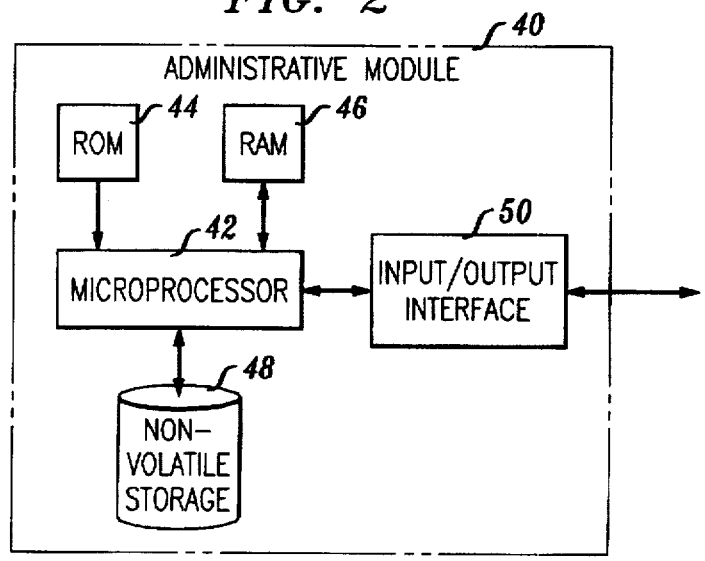
FIG. 2 is a block diagram of a processing module as utilized in FIG. 1.

FIG. 2 illustrates a processing module 40 which is representative of processing modules found in the NCP 30 and in the central office switches 10 and 12. The module 40 includes a microprocessor 42 supported by read-only memory (ROM) 44, random access memory (RAM) 46 and nonvolatile storage device 48 such as a hard disk drive. The microprocessor transmits and receives information through input/output interface circuit 50. The processing module 40 operates under the control of program instructions stored in ROM 44 and RAM 46. Data to be accessed by the module may be stored in nonvolatile storage device 48 and may be loaded into RAM 46 prior to utilization of the data.

FIG. 3 is a table 60 illustrating called party records such as stored in a database. The records consist of rows (fields) associated with columns including a called party field 62 which identifies each record such as by the directory number of the called party. Call screening column 64 provides an indication of whether the corresponding user subscribes to the call screening feature. Column pairs 66, 68 and 70, 72 define parameters associated with call screening such as the type (category) of call 66, 70 and the call handling to be provided for such type calls as indicated by the data stored in fields in columns 68, 72. In accordance with the illustrative embodiment, different types or categories of incoming calls can be recognized and handled by a procedure defined in data stored in columns 68, 72 in the called party record. In table 60, called party records for subscribers 74 and 76 are illustrated. In these two records, each subscriber has subscribed to the call screening process as indicated by YES in column 64 and has data entries in columns 66–72 indicating that different incoming types of calls will receive different call handling in accordance with the desires of the subscribers.

GENERAL OPERATION

In accordance with an embodiment of the present invention, screening of incoming calls is provided by the central office switch which serves the destination line/CPE. A code reflecting the call type or category is received by the destination central office switch. The call type information can be generated manually by the calling party, automatically by the calling party's CPE upon initiating the call, or by the origination central office based on a call originated by a predetermined line. The destination central office of the call retrieves a called party record for the called party and utilizes the received call type code to identify a corresponding handling instruction in the record. The record may be physically stored in a database in the destination central office or in a remote centralized database such as an NCP.

Upon identifying a particular call handling instruction from the called party record, the terminating central office will take further call processing steps dependent upon the call handling instruction. For example, the call handling instruction may be to merely route the call in a conventional manner to the destination CPE. The instruction may provide for call path completion to the CPE but with a particular distinctive ringing to be utilized at the destination CPE to alert the user of the call type. Alternatively, the call can be routed to an alternative messaging service such as an answering machine or other electronic storage mechanism to receive information from the calling party for later retrieval by the called party. Yet another alternative exists to provide an instruction which will decline call completion to the destination CPE such as by having the destination central office switch provide a prompt to the calling party indicating that calls of this call type are not accepted by the called party. Such processing is handled by the central office switch without ringing the destination CPE, i.e. without call completion to the CPE, and without requiring any decision making on the part of the destination CPE. This provides subscribers with substantial flexibility in providing a programmable predetermined instruction which will provide different call screening for different types of received calls.

DETAILED OPERATION

In accordance with this example, a subscriber utilizing CPE 16 desires to initiate a call by central office switch 10 to a destination subscriber associated with CPE 20 which is supported by central office switch 12. Referring to FIG. 3, the subscriber associated with CPE 20 corresponds with called party record 74. In this example the subscriber associated with CPE 20 has previously determined not to accept calls from a telemarketer (call type "*7"). In this example the "1" in column 68 defines a call type handling in which central office switch 12 is instructed to deny completion from the switch to CPE 20 for incoming type "*7" calls.

In accordance with this example, the following steps are implemented.

(1) A telemarketer using CPE 16 desires to place a call to the subscriber associated with CPE 20. In this illustrative example it is assumed that regulatory rules require that telemarketers must enter a call type code at the time of placing a call for the purposes of soliciting sales by telephone. In this example the telemarketer enters "*7" which is defined as a standard code denoting a telemarketing call. It will be appreciated that alternatives exist to requiring the manual entry of the call type code such as the automatic generation of the code by the corresponding CPE upon placing each call or the automatic generation of such a code for all calls placed on the line associated with CPE 16 by central office switch 10.

(2) A telemarketer then enters the called party number "708-231-1234".

(3) Central office switch 10, upon receiving the call type code and the requested destination number identifies the call as requiring to be routed to central office switch 12. Utilizing common channel signaling, known as SS7 signaling, central office switch 10 transmits the call request by STP 24, signaling network 26, and STP 28 to central office 12. This signaling message includes the called party number, the calling party number, and other call handling parameters including the call type code "*7".

(4) Central office switch 12 receives the call request and locates the called party record 74 based on the called party number in a database internal to switch 12. Alternatively, the switch could generate a query to NCP 30 to locate the record and have the information stored in the record transmitted back to switch 12.

(5) Switch 12 then proceeds to process the incoming call request by comparing the call type to the stored call types associated with the record 74 to determine if a match exists. If no match is found, the call is handled according to a defined default process such as normal call completion to the destination CPE. Upon finding a match with the call type in field 66, switch 12 then executes the handling of the call in accordance with an instruction defined by field 68. In accordance with the exemplary invention the "1" in field 68 has been previously defined as a rejection of all calls with this call type. Another table (not shown) stores records for each predetermined call type and control instructions that determine the processing of the call request.

(6) Central office switch 12 does not generate ringing on the line associated with CPE 12 in view of these handling instructions. Instead, central office switch 12 generates a reply SS7 message through the signaling network to central office switch 10 identifying this call request to be handled as a type "1".

(7) Upon central office switch 10 receiving this information concerning the original call request, central office switch 10 generates a call request termination message to clear the requested call setup and sends this message to central office switch 12 by the signaling network.

(8) Central office switch 10 engages an automatic announcement module which provides a recorded voice message to the telemarketer at CPE 16 that the called subscriber has elected not to accept calls of this call type. Alternatively, central office switch 10 could generate a signal or other indicia, preferably, informing the calling party that the call is not to be completed. It is believed that some form of notification is preferable to simply providing a busy signal or other indication which would not convey the message that calls placed using this call type are not accepted.

Another example of call screening in accordance with an embodiment of the present invention is described below. In this example, a subscriber associated with CPE 18 seeks charitable donations which is classified in accordance with the embodiment of the present invention as a call type "*6". Like the above example, the subscriber associated with CPE 18 desires to call the subscriber of CPE 20 which is associated with called party record 74.

(1) In this example, central office switch 10 has been programmed to treat all calls originating from the line connected to CPE 18 as call handling type "*6" indicating that such calls are associated with charitable solicitations.

(2) After the entry of the called party number at CPE 18, the call type, calling party number, and called party number are transmitted by the signaling network to central office switch 12.

(3) The called party record 74 is located in the database of central office switch 12 as associated with CPE 20 based on the called party directory number.

(4) Central office switch 12 then compares the received call type code with the stored call types and determines that a match exists with the call type "*6". In record 74 field 70 defines a corresponding call handling treatment "2". In accordance with this example, call treatment type "2" has been predefined to provide call acceptance to a voice mailbox supported by central office switch 12 associated with CPE 20. In accordance with this handling instruction, central office switch 12 directs the incoming call request to an electronic mailbox in switch 12. Preferably, the calling party is provided with a voice announcement informing the calling party that the called subscriber handles such call types by accepting information only through voice mail. Following this announcement, any voice message which is desired can be left and stored by central office switch 12 for CPE 20. This permits the subscriber to later scan and listen to such messages at the subscriber's convenience.

In view of the above examples, it is believed to be apparent that a variety of call types can be handled in a variety of ways based upon predetermined and defined information stored in called party records associated with the called party. This provides a convenient technique for called parties to control the handling of calls based on call type. It is further advantageous in that such handling is accomplished without call-by-call processing by the subscriber or the subscribers' CPE.

Although an embodiment of the invention has been described and shown above, the invention is defined by the claims which follow.

The invention claimed is:

1. A method for processing incoming telephone calls comprising the steps of:

receiving at a destination telecommunication switch a request to establish a call to a first customer's line coupled to the switch;

said request including call type data identifying the party originating the request as one of a plurality of predetermined call categories, said call type data not derived from a telephone number associated with the originating party;

reading a first record associated with the first line in a first database, said first record having at least one set of data including first data defining a first call category and second data determinative of processing of the incoming call identified as the first call category;

processing the incoming call at the switch as determined by said second data if the one call category of the incoming call is equal to the first call category.

2. The method according to claim 1 wherein said processing step processes the incoming call at the switch as determined by said second data if the one call category of the incoming call is equal to the first call category without call completion by the switch to the first line.

3. A telecommunication switch that processes incoming telephone calls comprising:

means for receiving at a destination telecommunication switch a request to establish a call to a first customer's line coupled to the destination switch, said request including call type data identifying the party originating the request as one of a plurality of predetermined call categories, said call type data not derived from a telephone number associated with the originating party;

means for reading a first record associated with the first line in a first database, said first record having at least one set of data including first data defining a first call category and second data determinative of processing of the incoming call identified as the first call category;

means for processing the incoming call at the destination switch as determined by said second data if the one call category of the incoming call is equal to the first call category.

4. The telecommunication switch according to claim 3 wherein said processing means processes the incoming call at the destination switch as determined by said second data if the one call category of the incoming call is equal to the first call category without call completion by the destination switch to the first line.

5. The method according to claim 1 further comprising the step of generating a message that is communicated to the originating party upon the second data corresponding to the call type data causing the incoming call request not to be completed to the first customer's line, said message advising the call originator that the call will not be completed.

6. The method according to claim 5 wherein said message advises the call originator that the call will not be completed based on the call originator's call category.

7. The telecommunication switch according to claim 3 further comprising means for causing call origination requests from a first telecommunication line connected to a first call originator to automatically generate corresponding first call type data that is transmitted as part of each call request, said first call type data identifying the first call originator as a member of one class of call originators where other classes of call originators also exist.

8. The telecommunication switch according to claim 7 further comprising means for providing the first customer with selectable call handling based on different classes of call originators by specifying second data corresponding to the call handling desired for corresponding call type data representing different call classes.

9. The telecommunication switch according to claim 3 further comprising means for generating a message that is communicated to the originating party upon the second data corresponding to the call type data causing the incoming call request not to be completed to the first customer's line, said message advising the call originator that the call will not be completed.

10. The telecommunication switch according to claim 9 wherein said generating means generates said message that advises the call originator that the call will not be completed based on the call originator's call category.

11. The telecommunication switch according to claim 3 further comprising means for causing call origination requests from a first telecommunication line connected to a first call originator to automatically generate corresponding first call type data that is transmitted as part of each call request, said first call type data identifying the first call originator as a member of one class of call originators where other classes of call originators also exist.

12. The telecommunication switch according to claim 11 further comprising means for providing the first customer with selectable call handling based on different classes of call originators by specifying second data corresponding to the call handling desired for corresponding call type data representing different call classes.

13. A method for processing incoming telephone calls comprising the steps of:

receiving at a telecommunication device a request to establish a call to a first consumer premises equipment (CPE);

said request including call type data identifying the party originating the request as one of a plurality of defined call categories, said call type data not derived from a telephone number associated with the originating party;

reading a first record associated with the first CPE in a first database, said first record having at least one set of data including first data defining a first call category and second data determinative of processing of the incoming call identified as the first call category; and processing the incoming call at the device as determined by said second data if the one call category of the incoming call is equal to the first call category.

14. The method according to claim 13 wherein said processing step processes the incoming call without call completion to the first CPE if the one call category of the incoming call is equal to the first call category.

15. The method according to claim 13 further comprising the step of generating a message that is communicated to the originating party upon the second data corresponding to the call type data causing the incoming call request not to be completed to the first customer's line, said message advising the call originator that the call will not be completed.

16. The method according to claim 15 wherein said message advises the call originator that the call will not be completed based on the call originator's call category.

17. The method according to claim 13 further comprising the step of defining a plurality of different classes of call originators and assigning a unique call type data for each such class.

18. The method according to claim 17 further comprising the step of requiring that each call originator of said defined classes transmit the call type data that corresponds to the defined class in order to facilitate call processing by first customers based on said class.

* * * * *